Figure 3:
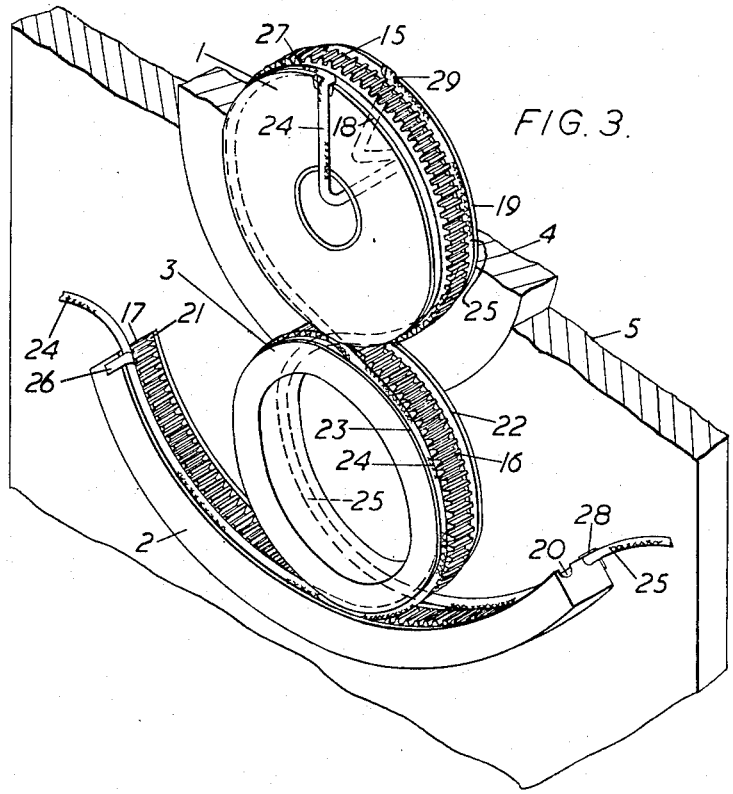

Sept. 19, 1961 G. L. AITKEN 3,001,034
MECHANISM FOR MECHANICALLY MAINTAINING TAUT AN
ELECTRICAL CABLE BETWEEN TWO RELATIVELY
Filed Dec. 21, 1959 ROTATABLE MEMBERS
2 Sheets-Sheet 1
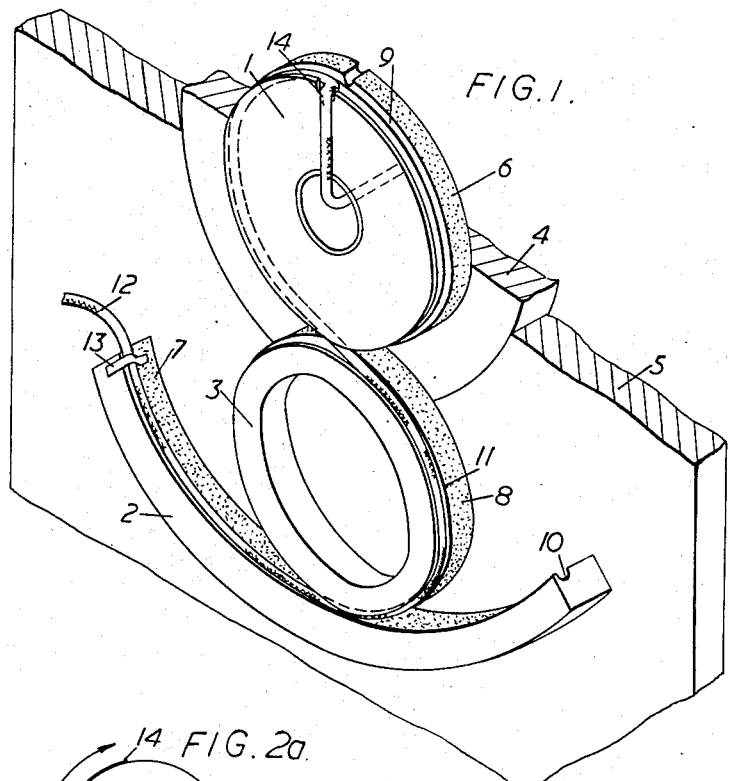
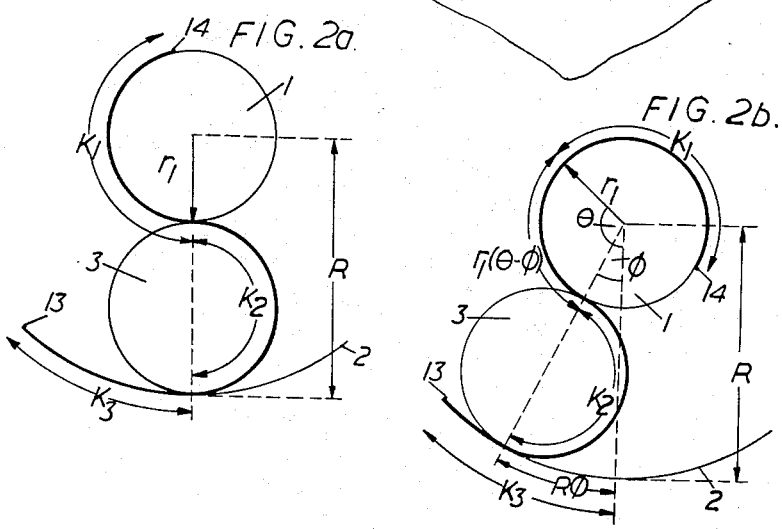
Inventor
GEORGE LEWIS AITKEN
By
Cameron, Kerkam & Sutton
Attorneys

*Inventor*
GEORGE LEWIS AITKEN

United States Patent Office 3,001,034
Patented Sept. 19, 1961

3,001,034
MECHANISM FOR MECHANICALLY MAINTAINING TAUT AN ELECTRICAL CABLE BETWEEN TWO RELATIVELY ROTATABLE MEMBERS
George Lewis Aitken, Edinburgh, Scotland, assignor to Ferranti, Limited, Lancashire, England, a company of Great Britain and Northern Ireland
Filed Dec. 21, 1959, Ser. No. 860,904
Claims priority, application Great Britain Jan. 2, 1959
8 Claims. (Cl. 191—12)

This invention relates to electrical couplings between two relatively rotatable members in which the relative rotation is less than 360°.

In certain kinds of electrical apparatus which is likely to be subjected to high acceleration forces, for example radar apparatus equipped with mechanical scanning aerials, it is necessary that certain units, for instance power supplies, mounted on a fixed structure should be electrically connected to other units mounted on a movable structure which is rotatable relative to the fixed structure.

Such connections are often made through slip rings or by an electrical cable anchored to the fixed structure and the movable structure, sufficient slack cable being left between the anchoring points to accommodate the required movement. These methods however suffer from well-known disadvantages. Slip rings suffer from contact difficulties such as dirty rings and varying contact resistance and slack cable is unsuitable for use if the apparatus as a whole is likely to be subjected to large vibrational or acceleration forces which may strain the cable or even tear it from its anchorings.

It is an object of the present invention to provide an electrical coupling between two relatively rotatable members in which these disadvantages are obviated.

According to the present invention an electrical coupling between two members capable of relative rotation about a given axis comprises an epicyclic train of wheels including a sun wheel rigid with one of said members and concentric with said given axis, an annular wheel rigid with the other of said members and concentric with said given axis and an odd number of planet wheels in a single train for inter-engaging said sun wheel and said annular wheel, said annular wheel having at least one groove around the concave surface thereof and each of the other wheels having at least one groove around the convex surface thereof, and at least one electrical connecting cable passing along a groove in the annular wheel from a fixed point thereon to the point of engagement with the first planet wheel and thereafter passing sequentially along a groove in each of the planet wheels and the sun wheel in opposite directions around adjacent wheels to a fixed point on the sun wheel.

If it is desired to utilise more than one electrical connecting cable, said sun wheel, annular wheel and planet wheels may each be provided with a separate groove for each cable.

If necessary, said sun wheel, annular wheel and planet wheels may be replaced by drums, each of which is provided with grooves to accommodate the electrical connecting cables, and in this specification reference to wheels is intended to include such drums.

Furthermore, said sun wheel and/or said annular wheel may be replaced by an arcuate portion thereof. It is therefore to be understood that the terms "sun wheel element" and "annular wheel element" as used in the appended claims include arcuate portions of such wheels as well as completely circular wheels.

The sun wheel, annular wheel and planet wheels may engage with each other through inter-meshing teeth in the manner of a normal epicyclic gear train or they may engage with each other by means of friction.

Where two electrical cables are utilised they may be passed along grooves in the sun wheel, the annular wheel and the planet wheels in opposite directions to each other and the wheels may then engage with each other through frictional engagement with the electrical connecting cables which may be reinforced with steel cores.

Figure 4:
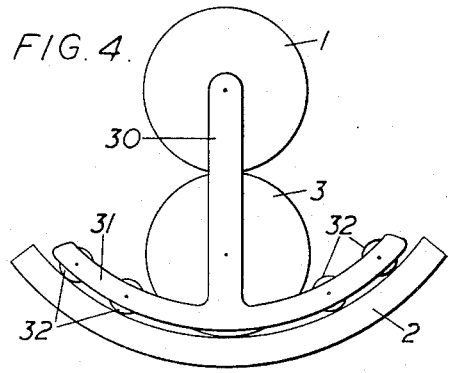

The invention will now be described by way of example with reference to the accompanying drawings in which:

FIGURE 1 is a perspective view of the essential components of a coupling in accordance with the invention,
FIGURES 2a and 2b are schematic drawings for illustrating the operation of the coupling shown in FIGURE 1,
FIGURE 3 is a perspective view of the essential components of a further coupling in accordance with the invention, and
FIGURE 4 is an outline drawing showing a modification of the coupling shown in FIGURE 3.

Referring now to FIGURE 1 of the drawings, the coupling shown includes a sun wheel 1, an arcuate portion 2 of an annular wheel and one planet wheel 3. The sun wheel 1 is rigid with a rotatable member 4 and the arcuate portion 2 is rigid with a fixed member 5. The sun wheel 1, arcuate portion 2 and planet wheel 3 interengage with each other through frictional engagement of the portions 6, 7 and 8, respectively, which portions are roughened to ensure a non-slip engagement. Grooves 9, 10 and 11 are provided in the sun wheel 1, arcuate portion 2 and planet wheel 3, respectively.

An electrical connecting cable 12 for connecting a unit (not shown) on the fixed member 5 to another unit (not shown) on the rotatable member 4 is fixed by a strap 13 in one end of the groove 10 in the arcuate portion 2. Thereafter the cable 12 passes along the groove 10 in a counterclockwise direction as far as the point of engagement of the arcuate portion 2 with the planet wheel 3, along the groove 11 in a counterclockwise direction as far as the point of engagement of the planet wheel 3 with the sun wheel 1 and then along the groove 9 in a clockwise direction to a fixed point 14 on the circumference of the sun wheel 1, thus passing in opposite directions around the adjacent planet and sun wheels. The cable 12 then passes through a central aperture in the sun wheel 1 and is taken to the unit (not shown) on the rotatable member 4.

The planet wheel 3 is retained in the same plane as the sun wheel 1 and the arcuate portion 2 by means of a flange mounted on the planet wheel 3, the flange engaging corresponding grooves in the sun wheel 1 and the arcuate portion 2. For reasons of clarity this has not been shown in the drawing.

Referring now to FIGURES 2a and 2b of the drawings to illustrate the operation of the coupling shown in FIGURE 1, it will be seen that when the planet wheel 3 is in its central position with respect to the arcuate portion 2 (FIGURE 2a) the length of the cable 12 between the two fixed points 13 and 14 is $$L_1 = K_1 + K_2 + K_3 \tag{1}$$

When the rotatable member 4 rotates through an angle $\theta$ (FIGURE 2b) the line joining the centres of the sun wheel 1 and the planet wheel 3 rotates through an angle $\varphi$, the relationship between $\theta$ and $\varphi$ being given by the well known epicyclic formula $$\theta = \varphi\left(1 + \frac{R}{r_1}\right) \tag{2}$$

where $r_1$ is the radius of the sun wheel 1 and R is the radius of the annular portion 2.

The length of the cable between the two fixed points 13 and 14 is now $$L_2 = K_1 + r_1(\theta - \varphi) + K_2 + K_3 - R\varphi$$
$$= K_1 + K_2 + K_3 + r_1(\theta - \varphi) - R\varphi \quad (3)$$

From Equation 2 however $$r_1(\theta - \varphi) - R\varphi = 0 \quad (4)$$

and therefore from Equation 3

$$L_2 = K_1 + K_2 + K_3 = L_1 \quad (5)$$

It will be seen from Equation 5 that if the rotatable member 4 rotates through any angle $\theta$, less than 180° from the central position, the length of cable between the two fixed points 13 and 14 remains constant and there is no slack cable between the two points.

If it is necessary to utilize more than one cable in order to make the necessary connections between units on the fixed member 5 and units on the rotatable member 4, a separate groove is provided for each cable in each of the wheels 1, 2 and 3, and if a sufficient number of cables are required the wheels 1, 2 and 3 may be replaced by cable drums.

An alternative arrangement in which two connecting cables are utilized is shown in FIGURE 3 of the drawings.

In this arrangement there is provided a sun wheel 1, an arcuate portion 2 of an annular wheel and a planet wheel 3, the sun wheel 1 being rigid with a rotatable member 4 and the arcuate portion 2 being rigid with a fixed member 5 as in the coupling shown in FIGURE 1. The wheels 1, 2 and 3 are provided with tracks of gear teeth 15, 16 and 17 respectively and the wheels interengage with each each other in the manner of a normal epicyclic gear train, this being a preferred manner due to the interaction of the gear teeth being more positive than the frictional engagement described in the previous example.

The sun wheel 1 is provided with two grooves 18 and 19, the arcuate portion 2 is provided with two grooves 20 and 21 and the planet wheel 3 is provided with two grooves 22 and 23. Two connecting cables 24 and 25 are provided to make the necessary connections between units (not shown) on the fixed member 5 and units (not shown) on the rotatable member 4.

The cable 24 is fixed in the groove 20 at one end of the arcuate portion 2 by a strap 26. From the strap 26 the cable 24 passes along the groove 20 in a counterclockwise direction as far as the point of engagement of the arcuate portion 2 with the planet wheel 3, along the groove 23 in a counterclockwise direction to the point of engagement of the planet wheel 3 with the sun wheel 1 and then along the groove 18 in a clockwise direction to a fixed point 27 on the sun wheel 1, thus passing in opposite directions around the adjacent planet and sun wheels. Thereafter the cable 24 passes through a central aperture in the sun wheel 1 to the unit (not shown) on the rotatable member 4.

The cable 25 follows a similar route from a strap 28 fixing it at one end of the groove 21 to a second fixed point 29 on the sun wheel 1, but it passes around the planet wheel 3 and the sun wheel 1 in opposite directions to the cable 24, and in this way the torques imposed on the movable members by the tautness of the two cables are made equal and opposite.

In practice it is sometimes found that the cables 24 and 25 do not pass along the grooves 20 and 21 in the arcuate portion 2 but form chords between the fixed straps 26 and 28 and the point of engagement of the arcuate portion 2 with the planet wheel 3, and some variation of the tension in the cables may result. If this variation is found to be undesirable an arrangement as shown in outline in FIGURE 4 may be utilized.

In the arrangement shown in FIGURE 4 the sun wheel 1, the arcuate portion 2 and the planet wheel 3 are arranged as in the previous two arrangements. A planet carrier 30 is provided with arcuate extensions 31 on which are mounted rollers 32. The rollers 32 bear on the cables (not shown) causing them to follow the grooves and thus maintain the tension in the cables substantially constant.

Whilst the sun wheel and the planet wheel have been shown in the above examples to be of equal diameter, the planet wheel may be of any required diameter or may be replaced by an odd number of planet wheels other than one.

Further, when two electrical connecting cables are used, as described with reference to FIGURE 3, it is possible to achieve satisfactory interengagement between the sun wheel, the planet wheel and the arcuate portion by utilizing the friction between the wheels and the electrical connecting cables, in which case the cables may be provided with a reinforcing steel core to prevent stretch of the cables and possible breakage.

In the embodiments described above the relative rotation between the two members is restricted to an angle of less than 360°. If rotation through an angle greater than 360° is required it is necessary to use two such couplings mechanically connected in series.

What is claimed is:

1. Mechanism for mechanically maintaining taut an electrical cable between two members capable of relative rotation about a given axis comprising an epicyclic train of wheel elements including a sun wheel element rigid with one of said members and concentric with said given axis, an annular wheel element rigid with the other of said members and concentric with said given axis and a planet wheel operatively interengaging said sun wheel element and said annular wheel element, said annular wheel element having at least one groove around the concave surface thereof and each of the sun wheel element and planet wheel having at least one groove around the convex surface thereof, and at least one electrical connecting cable passing along a groove in the annular wheel element from a fixed point on the concave surface thereof to the point of engagement with the planet wheel, and thereafter passing sequentially and in opposite directions along a groove in the planet wheel and a groove in the sun wheel element to a fixed point on the convex surface of the sun wheel element.

2. Mechanism as claimed in claim 1 including a plurality of electrical connecting cables and in which the sun wheel element, annular wheel element and planet wheel are each provided with a separate groove for each of said connecting cables.

3. Mechanism as claimed in claim 1 in which at least one of said sun wheel and annular wheel elements comprises an arcuate portion only of a circular wheel.

4. Mechanism as claimed in claim 1 in which said sun wheel element, annual wheel element and planet wheel include inter-meshing teeth.

5. Mechanism as claimed in claim 1 in which said planet wheel is in frictional engagement with said sun wheel and annular wheel elements.

6. Mechanism as claimed in claim 1 including two electrical connecting cables and two grooves in each of the sun wheel element, the annular wheel element and the planet wheel along which said cables pass, each cable passing around said sun wheel element and said planet wheel in opposite directions to the other cable.

7. Mechanism as claimed in claim 6 in which the sun wheel element, the annular wheel element and the planet wheel are in frictional engagement with said electrical connecting cables and are thereby operatively interengaged.

8. Mechanism as claimed in claim 7 in which said electrical connecting cables include reinforcing steel cores.

References Cited in the file of this patent

FOREIGN PATENTS

| | | |
|---|---|---|
| 703,931 | France | Feb. 16, 1931 |
| 825,780 | France | Dec. 16, 1947 |
| 856,982 | France | Apr. 8, 1940 |
| 628,591 | Germany | Apr. 7, 1936 |